United States Patent
Shimizu et al.

(10) Patent No.: US 10,247,306 B2
(45) Date of Patent: Apr. 2, 2019

(54) COMBINED OIL CONTROL RING

(71) Applicant: KABUSHIKI KAISHA RIKEN, Tokyo (JP)

(72) Inventors: Hiroshi Shimizu, Kashiwazaki (JP); Takayuki Ichikawa, Kashiwazaki (JP); Kazuya Mochiduki, Kashiwazaki (JP)

(73) Assignee: Kabushiki Kaisha Riken, Tokyo (JP)

( * ) Notice: Subject to any disclaimer, the term of this patent is extended or adjusted under 35 U.S.C. 154(b) by 0 days.

(21) Appl. No.: 15/564,844

(22) PCT Filed: Apr. 8, 2016

(86) PCT No.: PCT/JP2016/061489
§ 371 (c)(1),
(2) Date: Oct. 6, 2017

(87) PCT Pub. No.: WO2016/163498
PCT Pub. Date: Oct. 13, 2016

(65) Prior Publication Data
US 2018/0112775 A1    Apr. 26, 2018

(30) Foreign Application Priority Data
Apr. 9, 2015 (JP) ................................ 2015-079869

(51) Int. Cl.
F16J 9/00 (2006.01)
F16J 9/06 (2006.01)
F02F 5/00 (2006.01)

(52) U.S. Cl.
CPC ................ F16J 9/068 (2013.01); F02F 5/00 (2013.01)

(58) Field of Classification Search
CPC ................ F16J 9/06; F16J 9/068; F02F 5/00
See application file for complete search history.

(56) References Cited

U.S. PATENT DOCUMENTS 2,904,377 A    9/1959  Endres et al.
3,356,375 A *  12/1967 Harris ..................... F16J 9/066
                                                    267/1.5
(Continued)

FOREIGN PATENT DOCUMENTS

EP    2365233 A1 *  9/2011  ............... F16J 9/068
EP    2365233 B1 *  4/2014  ............... F16J 9/068
(Continued)

OTHER PUBLICATIONS

International Search Report (PCT/ISA/210) issued in PCT/JP2016/061489, dated Jun. 7, 2016.
Written Opinion (PCT/ISA/237) issued in PCT/JP2016/061489, dated Jun. 7, 2016.

*Primary Examiner* — Gilbert Y Lee
(74) *Attorney, Agent, or Firm* — Birch, Stewart, Kolasch & Birch, LLP

(57) ABSTRACT

To provide a combined oil control ring comprising a pair of upper and lower side rails and an axially corrugated spacer expander having upper and lower portions for automobile engines, which is capable of keeping an excellent oil-controlling function without sticking between a spacer expander and side rails even in a long period of engine operation, the upper and lower portions of the spacer expander have tabs pushing inner peripheral surfaces of the side rails, projections supporting the side rails, and intermediate portions between the tabs and the projections; and each intermediate portion opposing the side rail has a center-raised bottom having a center-raised shape when viewed along a substantially circumferential direction center-raised shape and a radial direction.

6 Claims, 2 Drawing Sheets

(56) References Cited

U.S. PATENT DOCUMENTS

| | | |
|---|---|---|
| 5,195,758 A | 3/1993 | Erway |
| 9,353,864 B2 | 5/2016 | Gao et al. |
| 9,458,933 B2 | 10/2016 | Ayuzawa et al. |
| 9,528,606 B2 | 12/2016 | Hitosugi et al. |
| 9,657,838 B2 | 5/2017 | Ooya |
| 2006/0169135 A1* | 8/2006 | Usui ................ F16J 9/068 92/248 |
| 2011/0221141 A1 | 9/2011 | Ayuzawa et al. |
| 2012/0235359 A1 | 9/2012 | Gao et al. |
| 2014/0062030 A1 | 3/2014 | Hitosugi et al. |
| 2014/0246834 A1* | 9/2014 | Ayuzawa ............ F16J 9/068 277/467 |
| 2015/0145218 A1 | 5/2015 | Ooya |

FOREIGN PATENT DOCUMENTS

| | | | |
|---|---|---|---|
| JP | 59-127856 U | 8/1984 | |
| JP | 2000-027995 A | 1/2000 | |
| JP | 2000018386 A * | 1/2000 | ............ F16J 9/068 |
| JP | 2002-310299 A | 10/2002 | |
| JP | 2003-254155 A | 9/2003 | |
| JP | 3628877 B2 * | 3/2005 | ............ F16J 9/068 |
| JP | 2006-258110 A | 9/2006 | |
| JP | 2011-185383 A | 9/2011 | |
| JP | 2011185383 A * | 9/2011 | ............ F16J 9/068 |
| JP | 2013-245780 A | 12/2013 | |
| JP | 2014-209018 A | 11/2014 | |
| WO | WO 2011/043364 A1 | 4/2011 | |
| WO | WO-2016159269 A1 * | 10/2016 | ............ F02F 5/00 |

\* cited by examiner

COMBINED OIL CONTROL RING

FIELD OF THE INVENTION

The present invention relates to a combined oil control ring mounted to pistons assembled in internal combustion engines, particularly to a combined oil control ring comprising a pair of upper and lower side rails and an axially corrugated spacer expander having upper and lower portions.

BACKGROUND OF THE INVENTION

In automobile engines, lubricating oil is exposed to a blowby gas and heated for a long period of operation, so that the lubricating oil is contaminated with unburned hydrocarbons and degenerated oil additives (called "oil sludge" as a whole). The oil sludge includes oil sludge precursors having relatively low viscosity. The oil sludge attached to and accumulated on engine parts likely wears the parts and clogs lubricating oil paths, causing troubles in the functions of engine parts such as combined oil control rings (called "oil rings" unless otherwise mentioned). In the oil rings, spacer expanders and side rails are stuck to each other in the worst case, hindering the movement of separate side rails, and thus failing to exhibit a sufficient oil-controlling function.

As shown in FIG. 3(b), a conventional oil ring comprises a pair of annular side rails 120a, 120b each having a gap, and a spacer expander 101 supporting the side rails. As shown in FIG. 3(a), the spacer expander in an axially corrugated form has upper portions 102, lower portions 103, and leg portions 104 connecting the upper portions and the lower portions. The upper portions and the lower portions have tabs 105a, 105b on the inner side, and projections 106a, 106b supporting the side rails on the outer side, and dented intermediate portions 107a, 107b between the tabs and the projections. When the spacer expander is combined with the side rails, space 108a, 108b is defined by each tab, each projection, each intermediate portion and each side rail.

In the oil ring, the side rails 120a, 102b are pressed by radial and axial components of a force due to the inclination angle of the tabs 105a, 105b of the spacer expander 101, thereby sealing a cylinder wall surface and side surfaces of ring grooves of a piston. Particularly, a small-width oil ring having a small axial width h1 has good followability to a cylinder sidewall for a side-sealing function, resulting in reduced friction loss without increasing oil consumption even if it is a low-tension type. In the oil ring, however, oil sludge is easily accumulated in spaces 108a, 108b between the spacer expander and the side rails as described above. Particularly in the case of a small-width oil ring with extremely narrow space, the side rails 120a, 120b are highly likely stuck to the spacer expander 101 by the accumulated oil sludge. When sticking occurs, the followability of the side rails to the cylinder wall decreases extremely, resulting in drastically increased oil consumption.

To prevent the attachment and accumulation of oil sludge to an oil ring, the surface coatings of spacer expanders and side rails, and the structures of spacer expanders avoiding the accumulation of oil sludge were disclosed.

For example, Patent References 1 and 2 disclose a fluororesin coating and a fluororesin-containing resin coating, Patent Reference 3 discloses a coating containing fluoroalkyl-substituted alkoxide, Patent Reference 4 discloses a hydrophilic prepolymer coating containing inorganic polysilazane, Patent Reference 5 discloses a method for forming a metal coating having low surface free energy and hydrogen bonding force. They are water-repellant, oil-repellant coatings, or oppositely hydrophilic coatings, or those formed by methods of preventing the attachment of oil sludge.

As a structural measure, Patent Reference 6 discloses an oil ring comprising a spacer expander having upper and lower portions, and intermediate portions between the upper and lower portions, the intermediate portions having holes not reaching uprising portions of corrugation but sufficiently large to permit foreign materials such as lead compounds to pass. Patent References 7 and 8 disclose spacer expanders having structures comprising radial grooves in intermediate portions, and oil-exiting holes communicating with the grooves in tabs. Patent Reference 9 discloses a spacer expander having a structure preventing the accumulation of oil sludge in spaces between intermediate portions and side rails, the axial inclination angle $\theta$ of leg portions connecting upper and lower portions being 15° or more, and the upper and lower portions being circumferentially short.

However, the coating methods of Patent References 1-5 suffer excess steps leading to cost increase, and the hole-forming method of Patent Reference 6 needs difficult working, making the oil rings expensive. Also, oil resides in the grooves formed in intermediate portions in Patent References 7 and 8 while engines are stopped, likely suffering the accumulation of oil sludge. As a result, sufficient durability is not obtained in such an operation pattern as undergoing repeated start and stop of engines.

PRIOR ART REFERENCES

Patent Reference 1: JP 2002-310299 A
Patent Reference 2: JP 2003-254155 A
Patent Reference 3: JP 2000-027995 A
Patent Reference 4: JP 2006-258110 A
Patent Reference 5: WO 2011/043364 A1
Patent Reference 6: JUM 59-127856 A
Patent Reference 7: U.S. Pat. No. 5,195,758 B
Patent Reference 8: JP 2011-185383 A
Patent Reference 9: JP 2013-245780 A

OBJECT OF THE INVENTION

To solve the above problems, an object of the present invention is provide a combined oil control ring for automobile engines capable of keeping an excellent oil-controlling function, without suffering sticking between a spacer expander and side rails for a long period of engine operation.

SUMMARY OF THE INVENTION

As a result of intensive research on the structure of intermediate portions of a spacer expander, the inventors have conceived of the structure of the combined oil control ring of the present invention, by which oil entering the intermediate portions surely flows out of the intermediate portions circumferentially or radially.

Thus, the combined oil control ring of the present invention comprises a pair of upper and lower side rails, and an axially corrugated spacer expander having upper and lower portions; the upper and lower portions of the spacer expander having tabs pushing inner peripheral surfaces of the side rails, projections supporting the side rails, and intermediate portions between the tabs and the projections; each intermediate portion opposing the side rail having a bottom which is center-raised when viewed along a substantially circumferential direction and a radial direction. The height p of the center-raised bottom is preferably 0.5-20% of the combined width h1.

Each center-raised bottom is preferably constituted by curved surfaces. In this case, each center-raised bottom preferably has a domed or conical shape.

Alternatively, each center-raised bottom is preferably constituted by pluralities of flat planes. In this case, each center-raised bottom preferably has a pyramid or truncated pyramid shape.

EFFECT OF THE INVENTION

The oil ring of the present invention has bottoms which are center-raised when viewed along a substantially circumferential direction and a radial direction, in intermediate portions of a spacer expander; the center-raised bottoms making it possible to surely flow oil out of the intermediate portions to their circumferential or radial sides. Particularly by a circumferential oil flow, oil can flow to large-space lower portions of the spacer expander, so that the retention of oil is surely prevented. The retention of oil is further prevented, when combined with a resin coating or a metal coating such as Ni for preventing sticking, thereby preventing the accumulation of oil sludge even in a small-width, low-tension oil ring. With this structure, the oil ring can exhibit sufficient durability in an operation pattern repeating the start and stop of an engine, without suffering the retention of oil in spaces between the spacer expander and the side rails even when an engine is stopped.

DESCRIPTION OF THE PREFERRED EMBODIMENTS

Figure 1A:
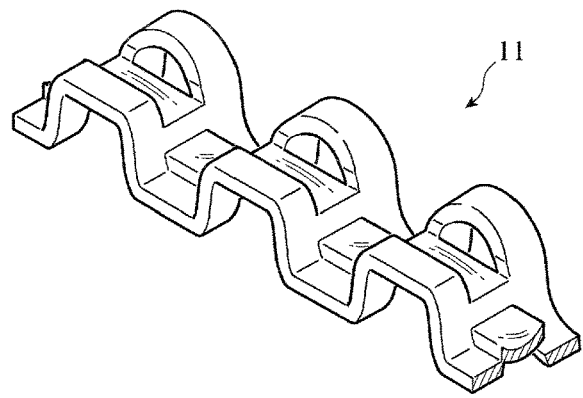
FIG. 1(a) is a perspective view partially showing an example of spacer expanders constituting the oil ring of the present invention.

The examples of the oil ring of the present invention will be explained below referring to the drawings.

Figure 1B:
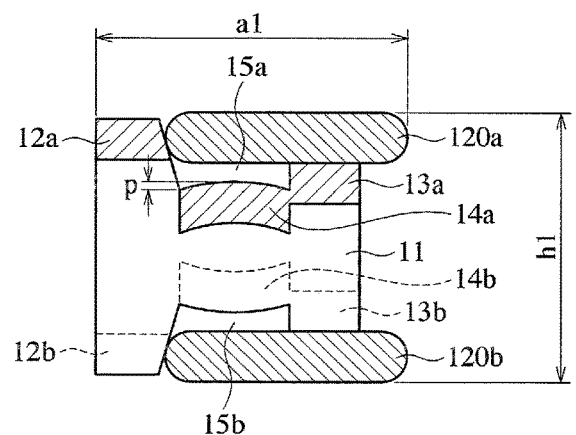
FIG. 1(b) is a cross-sectional view showing the oil ring of the present invention, in which the spacer expander of FIG. 1(a) is combined with side rails.

FIGS. 1(a) and 1(b) show an example of spacer expanders constituting the oil ring of the present invention. Like a conventional spacer expander, the spacer expander 11 comprises upper and lower portions each having a tab 12a, 12b, a projection 13a, 13b and an intermediate portion 14a, 14b. Each intermediate portion opposing the side rail has a bottom which is center-raised both in a substantially circumferential direction and in a radial direction. In this structure, each center-raised bottom is constituted by curved surfaces. With this shape, oil surely flows from the intermediate portion in a circumferential or radial direction of the intermediate portion. Accordingly, spaces 15a, 15b between the intermediate portions of the spacer expander and the side rails need not be expanded, but the height p of the center-raised bottom (height of a top of the center-raised bottom from a boundary of the intermediate portion and the tab or projection) is preferably 0.5-20% of the combined width h1. Specifically, the height p is preferably 0.05 mm or more, and its upper limit is preferably not more than 0.5 mm.

Though each intermediate portion may have pluralities of the above center-raised bottoms, it preferably has one center-raised bottom to make sure the flow of oil from the intermediate portion, and the intermediate portion is more preferably entirely occupied by the center-raised bottom. Specifically, the center-raised bottom is preferably in a domed or conical shape. Each center-raised bottom may have a flat plane on the top, though the flat plane should have a smaller area than that of the entire center-raised bottom.

Figure 2:
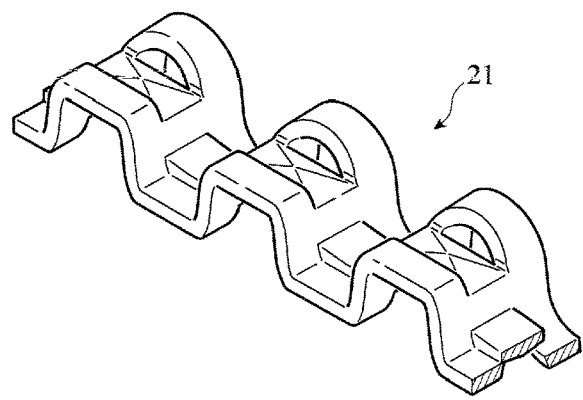
FIG. 2 is a perspective view partially showing another example of spacer expanders constituting the oil ring of the present invention.

FIG. 2 shows another example of spacer expanders 21. The intermediate portion has a bottom raised in a quadrangular pyramid shape.

The above spacer expander can be formed by plastically working the wire.

Example 1

A SUS440 wire of 0.35 mm×1.72 mm was formed into side rails, and a SUS304 wire of 0.25 mm×1.9 mm was formed into a spacer expander, to produce a combined oil ring having a nominal diameter d1 of 71 mm, a combined nominal width h1 of 2.0 mm, and a combined thickness a1 of 2.3 mm. The spacer expander had a pitch of 2.7 mm from an upper portion (lower portion) to an upper portion (lower portion), and each center-raised bottom in the intermediate portion had a curved surface shape with a height p of 0.1 mm as shown in FIGS. 1(a) and 1(b). There were spaces 15a, 15b of 0.1 mm between the highest points of the center-raised bottoms and the side rails.

Example 2

As shown in FIG. 2, a combined oil ring was produced in the same manner as in Example 1, except for changing each center-raised bottom in the intermediate portion of the spacer expander to a square-pyramid-shaped bottom. The height p of each center-raised bottom was 0.1 mm. Space 15a, 15b between the highest point of each center-raised bottom and each side rail was as wide as 0.1 mm.

Comparative Example 1

Figure 3A:
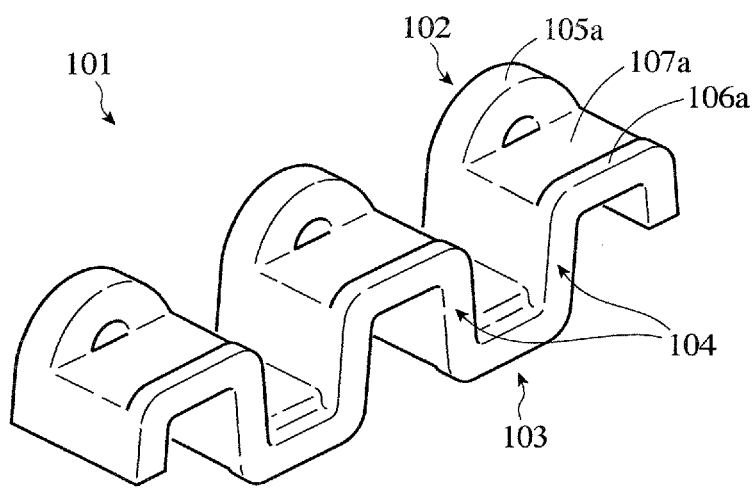
FIG. 3(a) is a perspective view partially showing a conventional spacer expander.
Figure 3B:
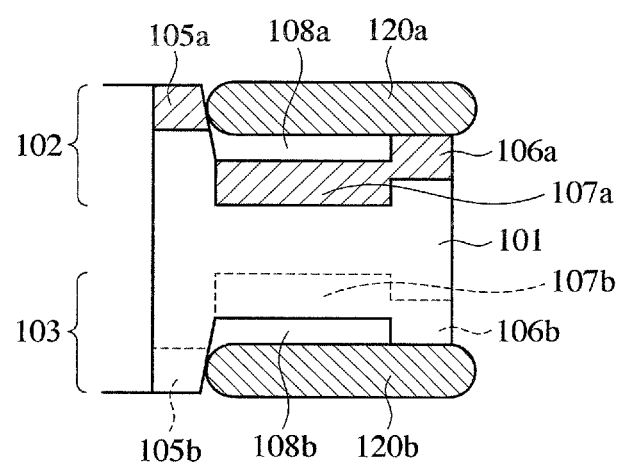
FIG. 3(b) is a cross-sectional view showing a conventional oil ring.

As shown in FIGS. 3(a) and 3(b), a combined oil ring was produced in the same manner as in Example 1, except for using a conventional spacer expander having flat intermediate portions with no center-raised bottoms. The distance between a side-rail-supporting surface of each projection and each intermediate portion was 0.1 mm.

Example 3

A SUS304 wire for a spacer expander used in Example 1 was provided with a Ni plating comprising a half-luster Ni plating layer and a bright Ni plating layer using a sulfamate solution, and subjected to a softening heat treatment at 600° C. for 30 seconds. The resultant Ni plating had a thickness of 5 μm and hardness of 226 HV0.01. A combined oil ring was produced in the same manner as in Example 1 except for using this Ni-plated wire.

Example 4

A combined oil ring was produced in the same manner as in Example 2 except for using the Ni-plated wire in Example 3.

[1] Actual Engine Test

Each combined oil ring of Examples 1 and 2 and Comparative Example 1 was mounted to each of first to third cylinders in a one-liter, three-cylinder engine. This engine was repeatedly subjected to a predetermined operation pattern for an actual engine test. According to the following evaluation methods after 250 hours, the gaps of side rails and the amount of oil sludge deposited were measured. Each measurement was conducted three times in each Example and Comparative Example. Top and second rings used had the following specifications.

(1) Top Ring

Material: SWOSC-V,

Outer peripheral surface: ion-plated with chromium nitride,

Size: d1=71 mm, h1=1.0 mm, and a1=2.3 mm.

(2) Second Ring

Material: SWOSC-V,

Entire surface: treated with zinc phosphate,

Size: d1=71 mm, h1=1.0 mm, and a1=2.3 mm.

Using the above one-liter, three-cylinder engine, the combined oil rings of Examples 3 and 4 and Comparative Example 1 were subjected to the actual engine test in the same manner as in Examples 1 and 2 and Comparative Example 1.

[2] Evaluation Method

The following evaluations were conducted after the actual engine test.

(1) Measurement of Side Rail Gap

After the actual engine test, the piston was withdrawn from the cylinder to measure the gaps $S_2$ of upper and lower side rails in the oil ring. Before the actual engine test, the gaps $S_1$ of upper and lower side rails when the oil ring was assembled to the piston, which were equal to gaps in a free state, were also measured to determine a ratio $S_2/S_1$. $S_2/S_1$ was determined in both upper and lower side rails, and averaged in three actual engine tests (six actual engine tests in Comparative Example 1).

(2) Measurement of Amount of Oil Sludge Deposited

After the actual engine test, the oil ring was detached from the piston, dried at 200° C. for 1 hour in an electric furnace, cooled to room temperature in a desiccator, and then measured with respect to its mass. Difference between the masses of the oil ring measured before and after the actual engine test was calculated, and averaged in three actual engine tests (six actual engine tests in Comparative Example 1) to determine the amount of oil sludge deposited.

The actual engine test results of Examples 1-4 and Comparative Example 1 are shown in Table 1. The gap is expressed by a relative value, assuming that $S_2/S_1$ in Comparative Example 1 is 100, and the amount of oil sludge deposited is expressed by a relative value, assuming that the amount of carbon sludge deposited in Comparative Example 1 is 100.

TABLE 1

| No. | $S_2/S_1$ | Amount of Oil Sludge Deposited |
|---|---|---|
| Example 1 | 285 | 61 |
| Example 2 | 235 | 64 |
| Example 3 | 330 | 41 |
| Example 4 | 290 | 46 |
| Com. Ex. 1 | 100 | 100 |

Table 1 indicates that as compared with the gap and the amount of oil sludge deposited after the actual engine test in Comparative Example 1, the gaps were as large as about 2.3-2.8 times in Examples 1 and 2 and 2.9-3.3 times in Examples 3 and 4, and the amounts of oil sludge deposited were as small as 61-64% in Examples 1 and 2 and 41-46% in Examples 3 and 4. In Comparative Example 1, the accumulated oil sludge constrained the side rails, so that the gap did not easily return to an original one, even when the piston was withdrawn from the cylinder. On the other hand, in Examples 1-4, the attachment and accumulation of oil sludge were so reduced that constraint to the oil ring was lowered, closer to a state before the operation than in Comparative Example 1. It was observed that the amount of oil sludge deposited was extremely reduced, particularly when combined with a sticking-preventing Ni coating.

DESCRIPTION OF REFERENCE NUMERALS 11, 21, 31: Spacer expander
12a, 12b, 32a, 32b, 105a, 105b: Tab
13a, 13b, 33a, 33b, 106a, 106b: Projection
14a, 14b, 34a, 34b, 107a, 107b: Intermediate portion
15a, 15b, 35a, 35b, 108a, 108b: Space
102: Upper portion
103: Lower portion
104: Leg portion
120a, 120b: Side rail

What is claimed is:

1. A combined oil control ring comprising a pair of upper and lower side rails, and an axially corrugated spacer expander having upper and lower portions; said upper and lower portions of said spacer expander having tabs pushing inner peripheral surfaces of said side rails, projections supporting said side rails, and intermediate portions between said tabs and said projections; each intermediate portion opposing said side rail having a bottom which is center-raised when viewed along a substantially circumferential direction and a radial direction.

2. The combined oil control ring according to claim 1, wherein the height p of said center-raised bottom is 0.5-20% of the combined width h1.

3. The combined oil control ring according to claim 1, wherein each center-raised bottom is constituted by curved surfaces.

4. The combined oil control ring according to claim 1, wherein each center-raised bottom is constituted by pluralities of flat planes.

5. The combined oil control ring according to claim 3, wherein each center-raised bottom has a domed or conical shape.

6. The combined oil control ring according to claim 4, wherein each center-raised bottom has a pyramid or truncated pyramid shape.

* * * * *